(12) United States Patent
Murofushi et al.

(10) Patent No.: US 7,413,122 B2
(45) Date of Patent: Aug. 19, 2008

(54) COMMODITY INFORMATION REGISTERING APPARATUS AND COMMODITY INFORMATION REGISTERING METHOD

(75) Inventors: Nobuo Murofushi, Susono (JP); Kouichi Sano, Ihara (JP); Yasuo Matsumoto, Numazu (JP); Yasuhito Kiji, Mishima (JP); Shigetoshi Kunieda, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 0 days.

(21) Appl. No.: 11/787,448

(22) Filed: Apr. 16, 2007

(65) Prior Publication Data
US 2007/0194125 A1    Aug. 23, 2007

Related U.S. Application Data

(62) Division of application No. 11/205,203, filed on Aug. 16, 2005, now Pat. No. 7,222,785.

(51) Int. Cl.
*G06K 15/00* (2006.01)
(52) U.S. Cl. .................. 235/383; 235/472.02
(58) Field of Classification Search ............ 235/462.01, 235/461, 470, 472.02, 383; 705/16, 20, 23
See application file for complete search history.

(56) References Cited

U.S. PATENT DOCUMENTS

| | | | |
|---|---|---|---|
| 5,382,784 A | 1/1995 | Eberhardt | |
| 5,609,223 A | 3/1997 | Iizaka et al. | |
| 5,679,941 A | 10/1997 | Iizaka et al. | |
| 6,342,830 B1 | 1/2002 | Want et al. | |
| 6,641,042 B1* | 11/2003 | Pierenkemper et al. | 235/462.01 |
| 6,776,333 B2 | 8/2004 | Matsushita | 235/383 |
| 6,830,181 B1 | 12/2004 | Bennett | |
| 7,222,785 B2* | 5/2007 | Murofushi et al. | 235/383 |
| 2002/0145037 A1* | 10/2002 | Goodwin, III | 235/383 |
| 2003/0057276 A1* | 3/2003 | Appalucci et al. | 235/382 |
| 2004/0220860 A1* | 11/2004 | Persky et al. | 705/23 |
| 2005/0212673 A1 | 9/2005 | Forster | |

FOREIGN PATENT DOCUMENTS

| | | |
|---|---|---|
| CN | 1386251 A | 12/2002 |
| JP | 11-066435 | 3/1999 |
| JP | 2002-042239 | 2/2002 |
| JP | 2003-281626 | 10/2003 |
| WO | WO 00/10144 | 2/2000 |
| WO | WO 2004/109611 | 4/2004 |

* cited by examiner

*Primary Examiner*—Michael G. Lee
*Assistant Examiner*—Kristy A Haupt
(74) *Attorney, Agent, or Firm*—Harness, Dickey & Pierce, P.L.C.

(57) ABSTRACT

There is disclosed a commodity information registering apparatus which registers commodity information while a commodity is moved, comprising a radio tag reading section which reads a radio tag within a first field to acquire commodity identification information stored in the radio tag, an optical reading section which reads a code symbol within a second field to acquire commodity identification information described in the code symbol, and a registering section which registers one of the commodity information corresponding to the commodity identification information acquired from the radio tag and the commodity information corresponding to the commodity identification information acquired from the code symbol.

18 Claims, 7 Drawing Sheets

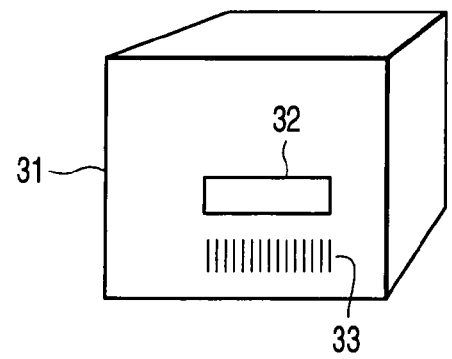
F I G. 3
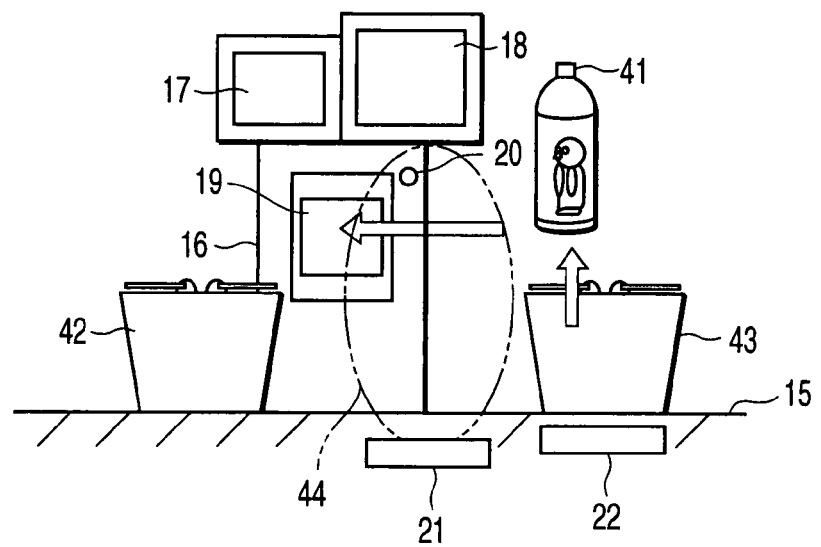
F I G. 4

COMMODITY INFORMATION REGISTERING APPARATUS AND COMMODITY INFORMATION REGISTERING METHOD

CROSS-REFERENCE TO RELATED APPLICATIONS

This application is a divisional application of U.S. Ser. No. 11/205,203 filed Aug. 16, 2005.

BACKGROUND OF THE INVENTION

1. Field of the Invention

The present invention relates to commodity information registering apparatus and method in which commodity identification information is read, from a radio tag (for example radio frequency identification tag), a code symbol or the like, and commodity information corresponding to the commodity identification information is registered. A radio frequency identification tag is called RFID tag for short.

2. Description of the Related Art

Commodity information registering apparatuses are provided with input devices for inputting commodity identification information such as identification data, sales prices, and manufacturing dates of commodities. The commodity identification information is sometimes described as barcode information in barcodes attached to the commodities, or stored as data carrier information in data carriers attached to the commodities. When the commodity identification information is the barcode information, a barcode reader is used as the input device. This barcode reader irradiates the barcode with light, and receives the reflected light to thereby acquire the commodity identification information. The commodity identification information is the data carrier information, a data carrier reader is used as the input device. This data carrier reader reads the data carrier information carried by a carrier wave oscillated from the data carrier by radio, and acquires the commodity identification information (see, e.g., Jpn. Pat. Appln. KOKAI Publication No. 11-66435).

Additionally, when the commodity provided with a radio tag is registered, the radio tag needs to be moved to a reading field of a radio tag reader. Therefore, in a store in which commodities provided with the barcodes and the radio tags, those provided with the barcodes only, and those provided with the radio tags only exist in a mixed manner, an operator who registers the commodities confirms presence of the radio tags. When there is the radio tag, the radio tag has to be moved to the reading field of the radio tag reader.

BRIEF SUMMARY OF THE INVENTION

An object of the present invention is to provide a commodity information registering apparatus and a commodity information registering method in which information from a radio tag or a code symbol can be read to register a commodity, while an operator who registers a commodity is moving the commodity with respect to a radio tag reading section and an optical reading section.

To solve the above-described problem and achieve the object, commodity information registering apparatus and method of the present invention are constituted as follows.

(1) A commodity information registering apparatus which registers commodity information while a commodity is moved, comprising a radio tag reading section which reads a radio tag within a first field to acquire commodity identification information stored in the radio tag; an optical reading section which reads a code symbol within a second field to acquire commodity identification information described in the code symbol; and a registering section which registers one of the commodity information corresponding to the commodity identification information acquired from the radio tag and the commodity information corresponding to the commodity identification information acquired from the code symbol.

(2) A commodity information registering apparatus comprising radio tag reading means for reading a radio tag within a first field to acquire commodity identification information stored in the radio tag; optical reading means for reading a code symbol within a second field to acquire commodity identification information described in the code symbol; and registering means for registering one of the commodity information corresponding to the commodity identification information acquired from the radio tag and the commodity information corresponding to the commodity identification information acquired from the code symbol.

(3) A commodity information registering method comprising a step of reading at least one of a radio tag and a code symbol which are attached to a commodity to acquire commodity identification information of the commodity; a step of registering commodity information corresponding to the commodity identification information, when the commodity identification information is acquired from one of the radio tag and the code symbol; a step of comparing the commodity information corresponding to these commodity identification information, when the commodity identification information are acquired from both of the radio tag and the code symbol; and a step of registering the commodity information, when the commodity information corresponding to the commodity identification information acquired from the radio tag is the same as that corresponding to the commodity identification information acquired from the code symbol.

According to the present invention, a radio tag or a code symbol is read to acquire commodity identification information, while a commodity is moved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is an appearance diagram of a radio tag and a barcode attached to a commodity according to the embodiment;

FIG. 4 is an explanatory view of commodity-information reading according to the embodiment;

DETAILED DESCRIPTION OF THE INVENTION

First to fifth embodiments of the present invention will be described hereinafter in detail with reference to the drawings.

First Embodiment

Figure 1:
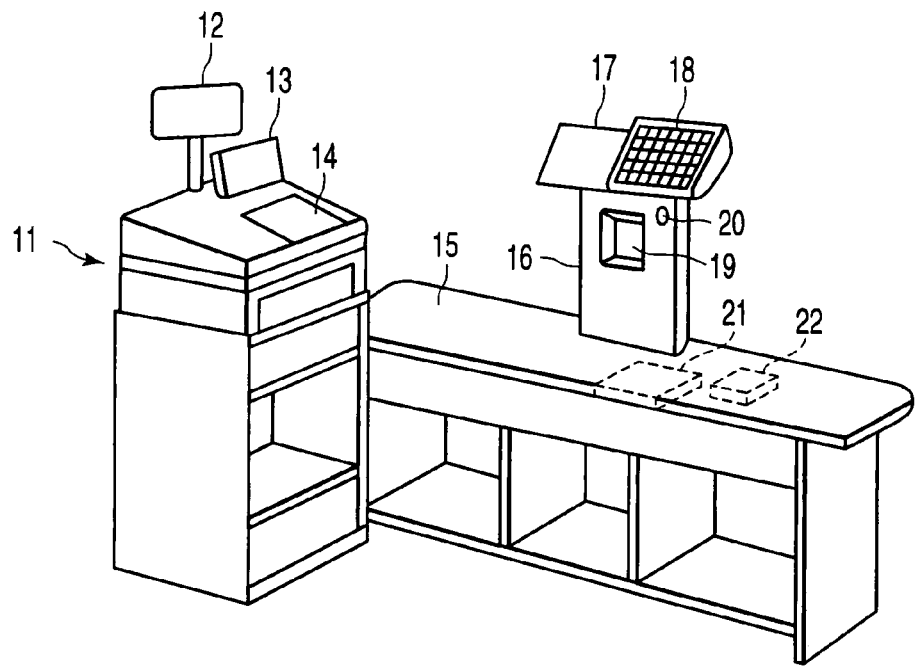
FIG. 1 is an appearance diagram of a commodity information registering apparatus according to a first embodiment of the present invention.

First, a first embodiment will be described with reference to FIGS. 1 to 6. FIG. 1 is an appearance diagram of a commodity information registering apparatus according to the present embodiment. As shown in FIG. 1, a point of sales (POS) terminal 11 comprises: a display section 12 for a customer; a terminal display section 13 for an operator who registers commodities; and a terminal input section 14 as a keyboard in which a key for finishing the registration and the like are arranged.

Reference numeral 15 denotes a commodity laying table. A stationary scanner 16 is substantially vertically disposed substantially in a center of the commodity laying table 15. The stationary scanner 16 is provided with: a scanner display section 17 which displays commodity information corresponding to commodity identification information, on reading the commodity identification information including, for example, a commodity identification code, a sales price, an expiry date and the like of the commodity; a scanner input section 18 which is a keyboard for commodity registration; a barcode reading section (optical reading section) 19 which optically reads code symbols such as a barcode and a two-dimensional code attached to the commodity; and a loudspeaker 20 which informs the operator that the commodity registration is completed or there is an error at a time of the registration of the commodity information.

On one surface of a main body of the stationary scanner 16, there is disposed a reading field of the barcode reading section 19. Inside the commodity laying table 15, there are disposed: a radio tag reading section 21 which communicates with a radio tag attached to the commodity to read the commodity identification information; and a sensor section 22 which detects that a basket containing commodities (commodities before registered) purchased by the customer has been placed on the commodity laying table 15.

The radio tag reading section 21 is provided with an antenna (not shown). The radio tag reading section 21 is disposed in an upstream position from the barcode reading section 19 with respect to a moving direction of the commodity. The sensor section 22 is disposed in the upstream position from the barcode reading section 19 and the radio tag reading section 21 with respect to the moving direction of the commodity.

The customer stands on a side opposite to the POS terminal 11 with respect to the commodity laying table 15. Moreover, the customer places the basket containing the commodities before registered in a place of the commodity laying table 15 where the sensor section 22 is disposed, and moves toward the POS terminal 11 to perform settlement of purchase prices. The operator stands on the other side with respect to the commodity laying table 15.

Figure 2:
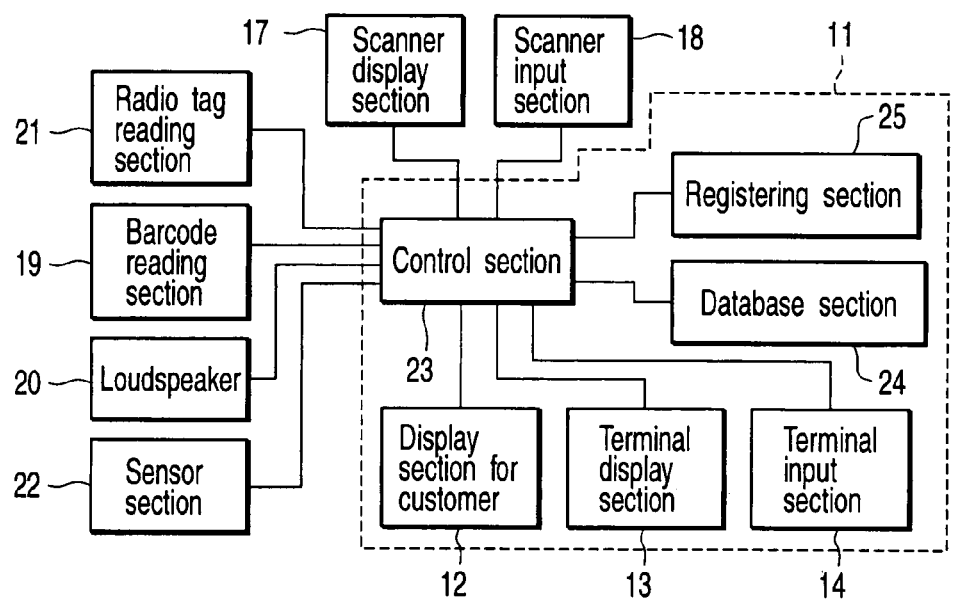
FIG. 2 is a block diagram of the commodity information registering apparatus according to the embodiment.

FIG. 2 is a block diagram of the commodity information registering apparatus according to the present embodiment. As shown in FIG. 2, the POS terminal 11 is provided with: a control section 23 which operates in accordance with a pre-stored program; the display section 12 for the customer; the terminal display section 13; the terminal input section 14; a database section 24 in which the commodity identification information and the corresponding commodity information are stored; and a registering section 25 in which the commodity identification information and the registered commodity information are stored.

The control section 23 is connected to all of the display section 12 for the customer, the terminal display section 13, the terminal input section 14, the database section 24, the registering section 25, the scanner input section 18, the scanner display section 17, the radio tag reading section 21, the barcode reading section (optical reading section) 19, the loudspeaker 20, and the sensor section 22. All functions are controlled in accordance with a program stored in the control section 23.

FIG. 3 is an appearance diagram of the radio tag and the barcode attached to the commodity according to the present embodiment. As shown in FIG. 3, a radio tag 32 and a barcode 33 are attached to an outer side surface of a commodity package 31. Since the barcode 33 is optically read, it needs to be disposed outside the commodity package 31. However, since the radio tag 32 is read using an electromagnetic wave, the tag may be attached to the inside of the commodity package 31 unless the commodity package 31 is made of a material that interrupts the electromagnetic wave.

In the barcode 33, a country number, a maker number, an item code, and a check digit are described as the commodity identification information. In addition to the same information as that described in the barcode 33, a serial code for managing the commodity 31 separately from another commodity is stored as the commodity identification information in the radio tag 32.

It is to be noted that the code symbol like the two-dimensional code may be used instead of the barcode. In this case, the optical reading section 19 corresponding to the code symbol may be used, and the commodity information corresponding to the code symbol may be stored in the radio tag 32.

FIG. 4 is an explanatory view of commodity-information reading according to the present embodiment. As shown in FIG. 4, first, the operator places a basket 42 for containing a registered commodity 41 in a downstream position of the commodity laying table 15 from the barcode reading section 19 with respect to the moving direction of the commodity 41.

When the customer places a basket 43 containing the commodity 41 on the sensor section 22 of the commodity laying table 15, the sensor section 22 detects that the basket 43 has been placed, and the barcode reading section 19 and the radio tag reading section 21 are started.

After the barcode reading section 19 is started, the section reads the barcode 33 held in front to the barcode reading section 19. Since the commodity information registering apparatus starts the barcode reading section 19 when the sensor section 22 detects the basket 43, unnecessary power consumption is suppressed.

After the radio tag reading section 21 is started, the section forms a reading field (first field) 44 of the radio tag 32 extending upwards from the commodity laying table 15 as shown by a two-dot chain line. The reading field 44 of the radio tag 32 is disposed in a locus of the commodity 41 at a time when the operator takes the commodity 41 out of the basket 43 and moves the commodity.

The radio tag reading section 21 is set in such a manner that the electromagnetic wave radiated from the antenna (not shown) of the radio tag reading section 21 is radiated intensely in an upward direction in order to form the reading field 44 in the upward direction from the commodity laying table 15.

In the commodity information registering apparatus, the radio tag reading section 21 is started, when the basket 43 is detected. Therefore, the unnecessary power consumption is suppressed, and the radiation of the electromagnetic wave is also suppressed. This inhibits interference of the electromagnetic wave with another apparatus. Since the reading field 44 is formed in the upward direction from the commodity laying table 15, the only information of the commodity 41 moving above the commodity laying table 15 is read.

The operator takes the commodity 41 out of the basket 43, and moves the commodity 41 in an arrow direction. Moreover, while the commodity 41 is moved, the operator changes a direction of the commodity 41 in the reading field 44 of the radio tag 32 in such a manner that a dead-angle portion of the commodity 41 which is out of operator's field of vision comes in sight, and checks if the barcode 33 is attached to the commodity 41.

Moreover, when the operator finds the barcode 33, the operator changes the direction of the commodity 41 in such a manner that the barcode 33 turns to the barcode reading section 19, and further moves the commodity 41 to the barcode reading section 19.

When the radio tag 32 is attached to the commodity 41, the radio tag reading section 21 reads the commodity identification information from the radio tag 32 attached to the commodity 41 during these operations by the operator. When the barcode 33 only is attached to the commodity 41, the barcode reading section 19 reads the commodity identification information from the barcode 33 attached to the commodity 41.

When the commodity information corresponding to the read commodity identification information is registered, a reading sound is output. Therefore, after confirming the reading sound, the operator places the commodity in the basket 42.

Next, commodity-information registration performed by the commodity information registering apparatus will be described.

Figure 5:
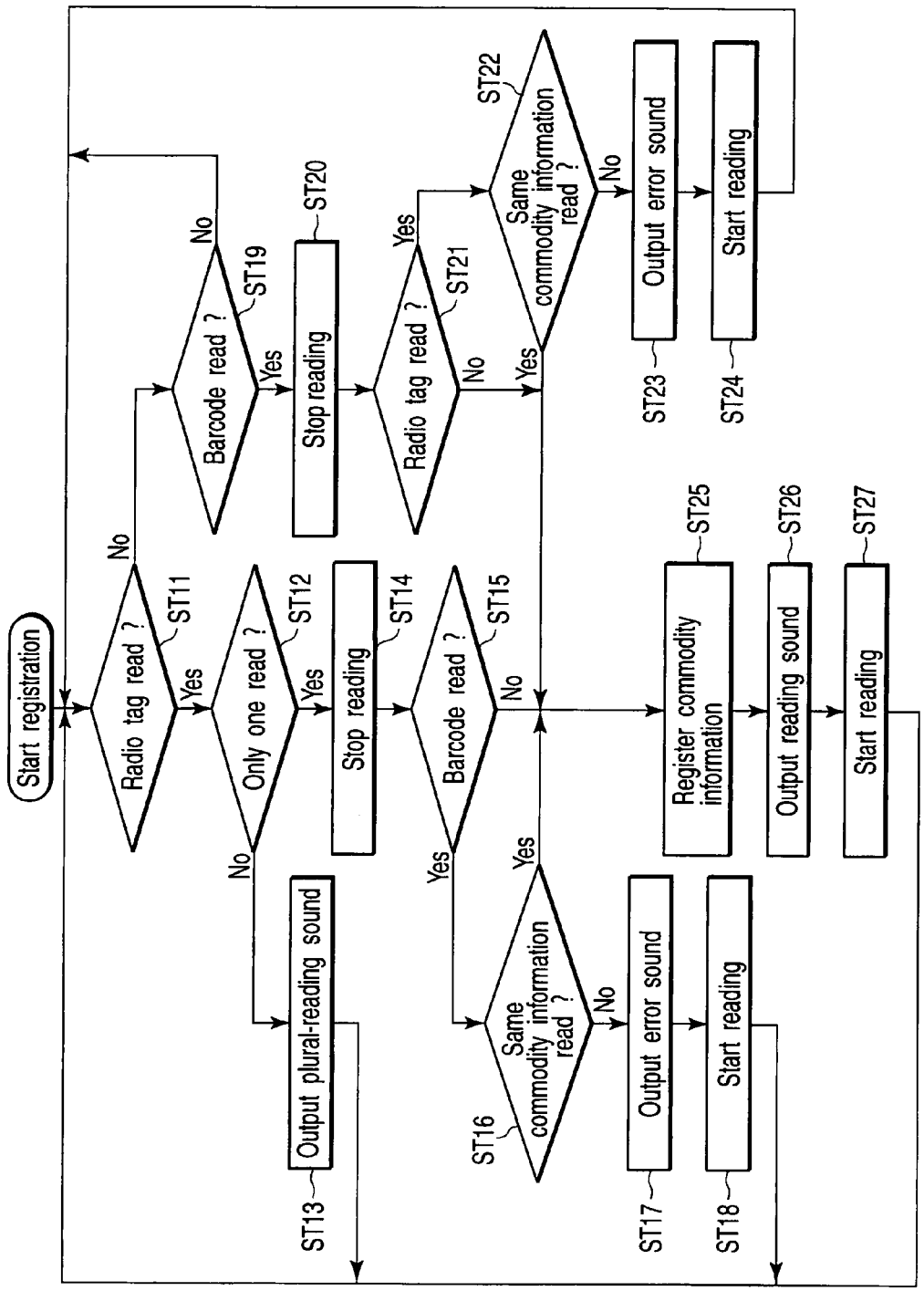
FIG. 5 is a flowchart showing commodity-information registration according to the embodiment.

FIG. 5 is a flowchart showing the commodity-information registration according to the present embodiment. When the basket 43 is placed on the sensor section 22 of the commodity laying table 15, the basket 43 is detected by the sensor section 22, the barcode reading section 19 and the radio tag reading section 21 are started, and the registration shown in FIG. 5 is started.

It is first judged in ST11 whether or not the radio tag 32 has been read. If it is judged in ST11 that the radio tag 32 has not been read, it is judged in ST19 whether or not the barcode 33 has been read. If it is judged in ST19 that the barcode 33 has not been read, the judgment of ST11 is performed again. If it is judged that the radio tag 32 and the barcode 33 have not been read, the judgments of ST11 and ST19 are repeated.

If it is judged in ST11 that the radio tag 32 has been read, it is judged in ST12 whether or not only one radio tag 32 has been read. Moreover, if it is judged in ST12 that a plurality of radio tags 32 have been read, a warning sound is output from the loudspeaker 20 in ST13 to inform the operator that a plurality of radio tags 32 have been read. Moreover, after outputting the warning sound, the judgment of ST11 is performed again. Consequently, the plurality of radio tags 32 can be prevented from being simultaneously registered.

If only one radio tag 32 is read in ST12, the reading by the barcode reading section 19 and the radio tag reading section 21 is stopped in ST14. Accordingly, since one commodity 41 is prevented from being read a plurality of times, one commodity 41 is not registered as a plurality of commodities 41.

The barcode 33 is sometimes read from when the radio tag 32 is read until the reading stops in ST14. It is judged in ST15 whether or not the barcode 33 has been read. Moreover, if it is judged in ST15 that the barcode 33 has not been read, processing of ST25 is performed. Conversely, if it is judged in ST15 that the barcode 33 has been read, it is judged in ST16 whether or not the commodity information corresponding to the commodity identification information read from the radio tag 32 is the same as that corresponding to the commodity identification information read from the barcode 33.

If it is judged in ST16 that the commodity information from the radio tag 32 is different from that from the barcode 33, there is an error in the information of the barcode 33 or the radio tag 32 attached to the commodity 41, or two commodities 41 are read. In this case, an error sound is output from the loudspeaker 20 in ST17, and the operator is informed that the commodity information from the radio tag 32 is different from that from the barcode 33. If the processing of ST17 ends, the reading by the barcode reading section 19 and the radio tag reading section 21 is started in ST18, and the judgment of ST11 is performed again.

If it is judged in ST15 that the barcode 33 has not been read or if it is judged in ST16 that the commodity information from the radio tag 32 agrees with that from the barcode 33, the processing of ST25 is performed.

If the commodity information is registered in ST25, the reading sound is output from the loudspeaker 20 in ST26 to inform the operator that the commodity registration has been performed. Thereafter, the reading by the barcode reading section 19 and the radio tag reading section 21 is started in ST27, and the judgment of ST11 is performed again. In this manner, it is possible to perform the commodity registration continuously.

If the radio tag 32 is not read in ST11 and if the barcode 33 is read in ST19, the reading by the barcode reading section 19 and the radio tag reading section 21 is stopped in ST20.

The radio tag 32 is sometimes read from when the barcode 33 is read until the reading stops in ST20. It is judged in ST21 whether or not the radio tag 32 has been read. Moreover, if it is judged in ST21 that the radio tag 32 has not been read, the processing of ST25 is performed. If it is judged in ST21 that the radio tag 32 has been read, it is judged in ST22 whether or not the commodity information corresponding to the commodity identification information read from the barcode 33 is the same as that corresponding to the commodity identification information read from the radio tag 32.

If it is judged in ST22 that the commodity information from the barcode 33 is different from that from the radio tag 32, there is an error in the information of the barcode 33 or the radio tag 32 attached to the commodity 41, or the commodity identification information of two commodities 41 are read. In this case, the error sound is output from the loudspeaker 20 in ST23, and the operator is informed that the commodity information from the barcode 33 is different from that from the radio tag. Moreover, after outputting the error sound, the reading by the barcode reading section 19 and the radio tag reading section 21 is started in ST24, and the judgment of ST11 is performed again.

If it is judged in ST21 that the radio tag 32 has not been read or if it is judged in ST22 that the commodity information from the barcode 33 agrees with that from the radio tag 32, the processing of ST25 is performed. Moreover, if the commodity information is registered in ST25, the reading sound is output from the loudspeaker 20 to inform the operator that the commodity registration has been performed in ST26. Furthermore, after outputting the reading sound, the reading by the barcode reading section 19 and the radio tag reading section 21 is started in ST27, and the judgment of ST11 is performed again.

Consequently, in a case where the commodity identification information of the commodity 41 provided with the barcode 33 and the radio tag 32 is read, even when both of the barcode 33 and the radio tag 32 are read, one commodity 41 is correctly registered as one commodity. The operator is securely informed that the commodity can be registered.

Thereafter, the next commodity is also registered in accordance with the flowchart of FIG. 5. Accordingly, even in a case where the commodity 41 provided with the barcode 33 and the radio tag 32, the commodity 41 provided with the barcode 33 only, and the commodity 41 provided with the radio tag 32 only exist in a mixed manner, when the operator moves the commodity 41 from the basket 43 containing the commodity 41 before registered to the basket 42 for containing the registered commodity 41, the barcode 33 or the radio tag 32 is read to register the commodity information.

Moreover, it is sometimes difficult to read the barcode 33 because of dirt on the barcode 33 portion or because a barcode 33 portion is not flat. Even in this case, when the barcode 33 and the radio tag 32 are attached to the commodity 41, the radio tag 32 is read by the radio tag reading section 21, and therefore an efficiency of the commodity registration is improved.

Furthermore, in the present embodiment, the reading field 44 of the radio tag 32 is disposed closer to the basket 43 containing the commodity 41 before registered, that is, closer to the sensor section 22 than the reading field of the barcode 33 is. Therefore, since the commodity information of the commodity 41 provided with the radio tag 32 is registered before directing the barcode 33 of the commodity 41 to the barcode reading section 19, the operation efficiency of the commodity registration is enhanced.

It is to be noted that the example in which the database section 24 is disposed inside the POS terminal 11 has been described above, but the present invention is not limited to this example. For example, the commodity identification information and the corresponding commodity information may be stored in a store server network-connected to the POS terminal 11. In this case, the POS terminal 11 sends to the store server an inquiry including the commodity identification information, and the store server returns the commodity information corresponding to the inquiry to the POS terminal 11.

Moreover, the sensor section 22 may be omitted. That is, the barcode reading section 19 and the radio tag reading section 21 may periodically read the reading field, and the operator may operate the terminal input section 14 or the scanner input section 18 to start the barcode reading section 19 and the radio tag reading section 21.

Furthermore, when the commodity identification information stored in the radio tag 32 agrees with that of the barcode 33, the commodity identification information of the radio tag 32 may be directly compared with that of the barcode 33 instead of the comparison of the commodity information from the radio tag 32 with that from the barcode 33 performed in ST16 and ST22 of FIG. 5.

Figure 6:
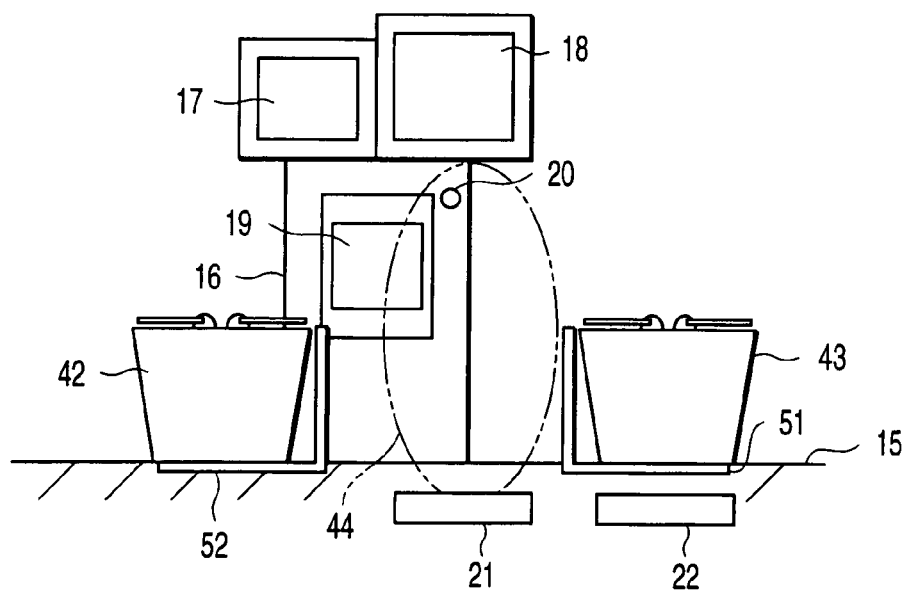
FIG. 6 is an explanatory view of the commodity-information reading according to the embodiment.

Next, a modification of the commodity information registering apparatus will be described. FIG. 6 is an explanatory view of the commodity-information reading according to a modification of the embodiment. As shown in FIG. 6, the commodity information registering apparatus of the present modification is provided with shielding plates 51, 52. The shielding plate 51 is disposed in the vicinity of a basket 43 containing a commodity 41 before registered, and the shielding plate 52 is disposed in the vicinity of a basket 42 for containing the registered commodity.

These shielding plates 51, 52 do not complete interrupt an electromagnetic wave, and may decay the electromagnetic wave radiated from the radio tag reading section 21 to such an electric power that a radio tag 32 in the basket 43 is not started. Therefore, there is not any restriction as to materials of the shielding plates 51, 52 as long as the materials are conductive or decay a frequency for use in communication of the radio tag 32.

Accordingly, since a radio tag reading section 21 does not read information of the commodity 41 in the basket 43, erroneous registrations are reduced. It is to be noted that even when the materials of the baskets 42, 43 are similar to those of the shielding plates 51, 52, that is, the materials which decay the electromagnetic waves, similar effects are obtained.

Second Embodiment

Figure 7:
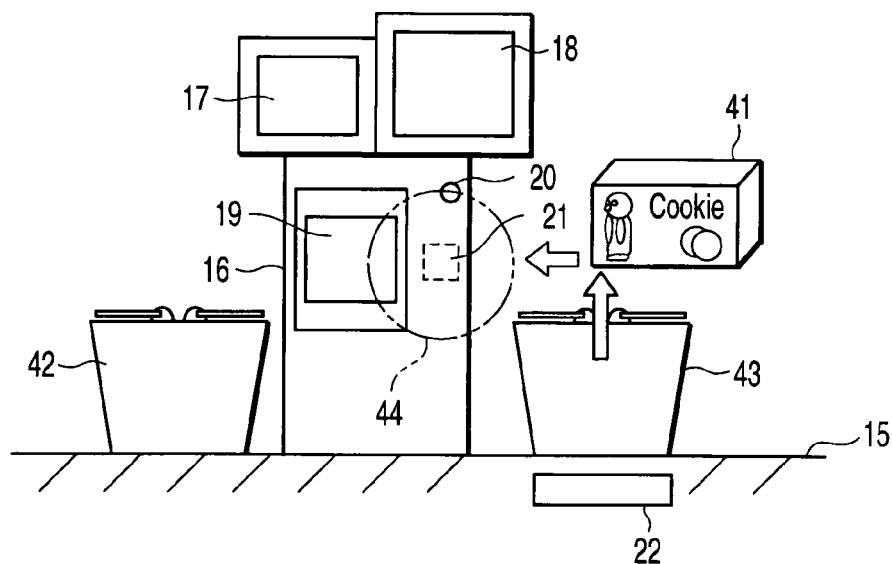
FIG. 7 is an explanatory view of the commodity-information reading according to a second embodiment of the present invention.

A second embodiment will be described with reference to FIG. 7. It is to be noted that in the following description, descriptions of a constitution and a function similar to those of the first embodiment are omitted.

In the first embodiment, the radio tag reading section 21 is disposed beside the barcode reading section 19 of the stationary scanner 16. On the other hand, in the present embodiment, a radio tag reading section 21 is disposed on one surface of a main body of a stationary scanner 16 on which a barcode reading section 19 is disposed. In the present embodiment, the radio tag reading section 21 is disposed in an upstream position from the barcode reading section 19 of the stationary scanner 16 with respect to a moving direction of a commodity.

First, an operator places a basket 42 for containing the registered commodity on a commodity laying table 15. When a customer places a basket 43 containing a commodity 41 to purchase on a sensor section 22 of the commodity laying table 15, the sensor section 22 detects that the basket 43 has been placed, and the barcode reading section 19 and the radio tag reading section 21 are started. After the radio tag reading section 21 is started, the section forms a reading field 44 of a radio tag 32 in a direction crossing the commodity laying table 15 as shown by a two-dot chain line. The reading field 44 of the radio tag 32 has a height equal to that of the barcode reading section 19.

While moving the commodity 41 to the barcode reading section 19, the operator changes a direction of the commodity 41 in such a manner that a barcode 33 attached to the commodity 41 turns to the barcode reading section 19. Even when the barcode 33 is not attached to the commodity 41, the operator changes the direction of the commodity 41 appropriately, while moving the commodity 41 to the barcode reading section 19.

The reading field 44 of the radio tag 32 is in a locus of the commodity 41 at a time when the operator moves the commodity 41 to the barcode reading section 19. Therefore, when the radio tag 32 is attached to the commodity 41, the radio tag reading section 21 reads commodity identification information from the radio tag 32 attached to the commodity 41 during these operations of the operator. In a case where the barcode 33 only is attached to the commodity 41, the barcode reading section 19 reads the commodity identification information from the barcode 33 attached to the commodity 41.

In a case where the radio tag reading section 21 is disposed in the commodity laying table 15, a height of the reading field 44 of the radio tag reading section 21 exceeds that of the barcode reading section 19.

On the other hand, in the present embodiment, since the radio tag reading section 21 is disposed next to the barcode reading section 19, the height of the reading field 44 of the radio tag 32 is approximately equal to that of the barcode reading section 19, and the field is formed in the direction crossing the commodity laying table 15.

Therefore, the reading field 44 of the radio tag reading section 21 is smaller than that of the first embodiment. Consequently, as to the radio tag reading section 21 in the present embodiment, a portion for radiating an electromagnetic wave is miniaturized as compared with the radio tag reading section 21 in the first embodiment.

Moreover, in the commodity information registering apparatus of the present embodiment constituted as described above, even in a case where the commodity 41 provided with the barcode 33 and the radio tag 32, the commodity 41 provided with the barcode 33 only, and the commodity 41 provided with the radio tag 32 only exist in a mixed manner, while the operator is moving the commodity 41 from the basket 43 containing the commodity 41 before registered to the basket 42 for containing the registered commodity 41, the barcode 33 or the radio tag 32 is read to register the commodity information.

Furthermore, in the present embodiment, the reading field 44 of the radio tag 32 is disposed closer to the basket 43 containing the commodity 41 before registered, that is, closer to the sensor section 22 than the reading field of the barcode 33 is.

Therefore, when the radio tag 32 is attached to the commodity 41, the commodity information is registered before directing the barcode 33 to the barcode reading section 19, and therefore an operation efficiency of commodity registration is enhanced.

Third Embodiment

Next, a third embodiment will be described with reference to FIGS. 8 to 11. It is to be noted that in the following description, description of the same constitution and function as those of the first and second embodiments is omitted.

In the first and second embodiments, the reading field 44 of the radio tag 32 is disposed closer to the basket 43 containing the commodity before registered, that is, closer to the sensor section 22 than the reading field of the barcode 33 is.

Figure 8:
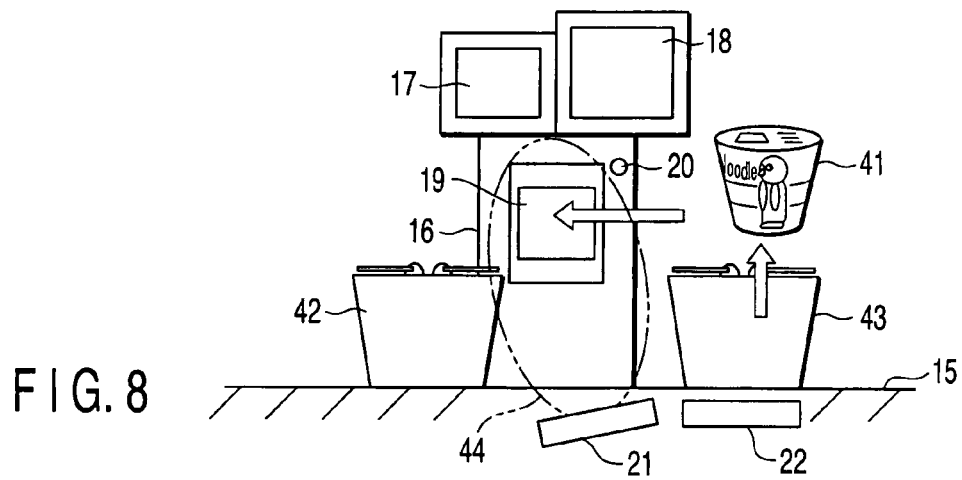
FIG. 8 is an explanatory view of the commodity-information reading according to a third embodiment of the present invention.

On the other hand, in the present embodiment, as shown in FIG. 8, a reading field 44 of a radio tag reading section 21 is disposed in such a manner as to include all of the reading field of a barcode reading section 19. Therefore, the radio tag reading section 21 of the present embodiment is disposed in a position different from that of the radio tag reading section 21 of the first embodiment.

Figure 9:
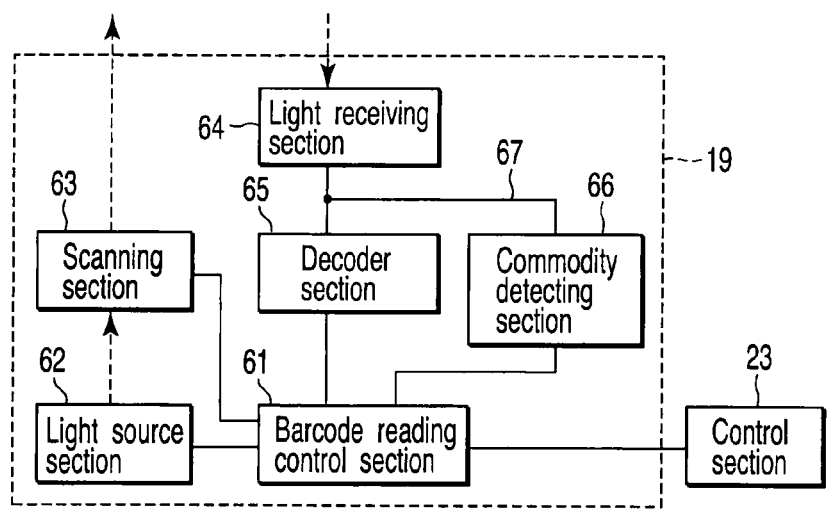
FIG. 9 is a block diagram of a barcode reading section according to the embodiment.

FIG. 9 is a block diagram of the barcode reading section 19 according to the present embodiment. As shown in FIG. 9, a light source 62 outputs light for use in reading a barcode 33. A scanning section 63 emits the light output from the light source 62 as scanning light to the outside of the barcode reading section 19. A light receiving section 64 receives the light which has been emitted from the scanning section 63 to the outside of the barcode reading section 19, reflected by an object, and returned. Moreover, the section converts a received light signal into an analog electric signal. A decoder section 65 converts the analog electric signal converted by the light receiving section 64 into a digital electric signal, and outputs information of the barcode 33 as the digital electric signal. A commodity detecting section 66 judges presence of the object from the analog electric signal converted by the light receiving section 64, and outputs a judgment result as a digital signal.

A barcode reading control section 61 is connected to the light source 62, the scanning section 63, the decoder section 65, and the commodity detecting section 66, and controls the barcode reading section 19. The barcode reading control section 61 is connected to a control section 23 of the commodity information registering apparatus, and is controlled by the control section 23.

Figure 10:
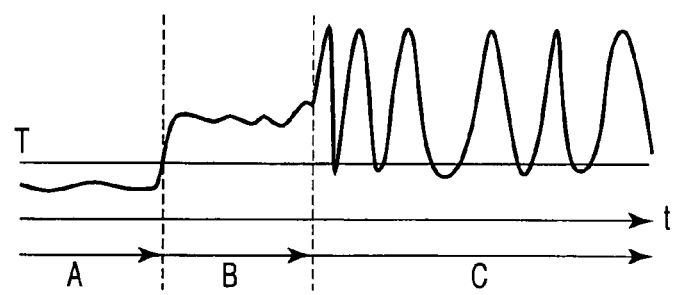
FIG. 10 is an explanatory view of an analog electric signal of a light receiving section according to the embodiment.

FIG. 10 shows one example of the analog electric signal appearing on an analog signal line 67. It is to be noted that in FIG. 10, the vertical axis indicates a time, and the horizontal axis indicates a voltage.

When there is not any commodity 41 in the reading field of the barcode reading section 19, the voltage of the analog signal line 67 is low as in a segment A of FIG. 10, and this is a noise level. When the commodity 41 comes in the reading field of the barcode reading section 19, the voltage of the analog signal line 67 becomes higher than the noise level as in a segment B of FIG. 10. This voltage depends on a reflectance of the commodity 41. When the barcode 33 attached to the commodity 41 comes in the reading field, the voltage of the analog signal line 67 has a waveform in accordance with widths of white and black bars of the barcode 33 as in a segment C of FIG. 10.

The commodity detecting section 66 outputs a signal indicating an L level, when the voltage of the analog signal line 67 is lower than a threshold value T. The section outputs a signal indicating an H level, when the voltage is higher than the threshold value T. When the barcode reading control section 61 detects that the signal from the commodity detecting section 66 changes from the L level to the H level, the section notifies the control section 23 that the commodity 41 has entered the reading field of the barcode 33. On receiving the notice that the commodity 41 has entered the reading field of the barcode 33, the control section 23 allows the radio tag reading section 21 to start the radiating of the electromagnetic wave.

Consequently, the commodity can be detected utilizing a function of reading the barcode 33. Only when the commodity 41 comes close to the reading field 44 of the radio tag 32, the electromagnetic wave for reading the radio tag 32 is output. Therefore, unnecessary power consumption is suppressed, and interference with another apparatus is also suppressed.

Moreover, the decoder section 65 digitizes and outputs the voltage in the segment C of FIG. 10. On receiving the digital signal from the decoder section 65, the barcode reading control section 61 transmits the digital signal to the control section 23.

First, an operator places a basket 42 for containing a registered commodity on a commodity laying table 15. When a customer places the basket 43 containing the commodity 41 to purchase on the sensor section 22 of the commodity laying table 15, the sensor section 22 detects that the basket 43 has been placed, and the barcode reading section 19 is started. At this time, the radio tag reading section 21 has not output any electromagnetic wave yet.

The operator takes the commodity 41 from the basket 43, and moves the commodity 41 in an arrow direction. In a case where the barcode 33 is attached to the commodity 41, the operator changes a direction of the commodity 41 in such a manner that the barcode 33 turns to the barcode reading section 19, while moving the commodity 41 to the barcode reading section 19.

Moreover, when the barcode 33 is not attached to the commodity 41, the operator changes the direction of the commodity 41 appropriately, while moving the commodity 41 to the barcode reading section 19. When it is detected that the commodity 41 has entered the reading field of the barcode reading section 19, the radio tag reading section 21 radiates the electromagnetic wave, and the reading field 44 appears.

When the radio tag 32 of the commodity 41 enters the reading field 44, the radio tag reading section 21 reads the commodity identification information from the radio tag 32 of the commodity 41. When the barcode 33 of the commodity 41 moves to the reading field of the barcode reading section 19, the barcode reading section 19 reads the commodity identification information from the barcode 33.

Figure 11:
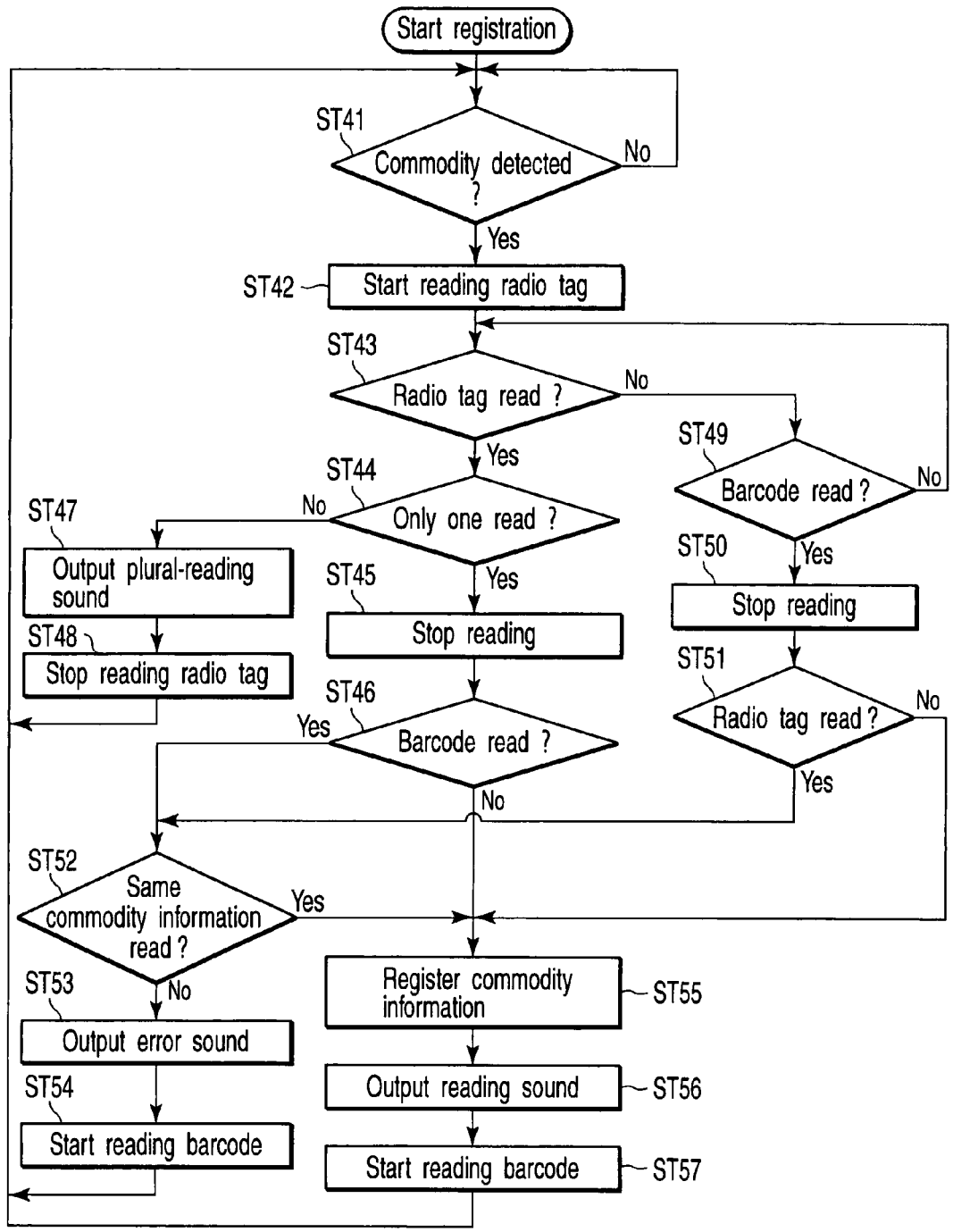
FIG. 11 is a flowchart showing the commodity-information registration according to the embodiment.

Next, commodity-information registration performed by the commodity information registering apparatus will be described. FIG. 11 is a flowchart showing the commodity-information registration according to the present embodiment. If the basket 43 is placed on the sensor section 22 of the commodity laying table 15, the basket 43 is detected by the sensor section 22, the barcode reading section 19 is started, and the registration shown in FIG. 11 is started.

It is judged in ST41 whether or not the barcode reading section 19 has detected the commodity 41. If the commodity 41 is not detected, the judgment of ST41 is repeated. If the commodity 41 is detected in ST41, an electromagnetic wave is radiated from the radio tag reading section 21 in ST42. Thus, the radio tag 32 can be read.

If the electromagnetic wave is radiated from the radio tag reading section 21, it is judged in ST43 whether or not the radio tag 32 has been read. Moreover, if it is judged in ST43 that the radio tag 32 has not been read, it is judged in ST49 whether or not the barcode 33 has been read. If it is judged in ST49 that the barcode 33 has not been read, the judgment of ST43 is performed again. If the radio tag 32 and the barcode 33 are not read, the judgments of ST43 and ST49 are repeated.

If it is judged in ST43 that the radio tag 32 has been read, it is judged in ST44 whether or not only one radio tag 32 has been read. Moreover, if it is judged in ST44 that a plurality of radio tags 32 have been read, a warning sound is output from the loudspeaker 20 in ST47 to inform the operator that the plurality of radio tags 32 have been read.

Moreover, after outputting the warning sound, the reading by the radio tag reading section 21 is stopped in ST48, and commodity detection of ST41 is performed again. Consequently, a plurality of radio tags 32 can be prevented from being simultaneously registered.

If it is judged in ST44 that only one radio tag 32 is read, the reading by the barcode reading section 19 and the radio tag reading section 21 is stopped in ST45. Accordingly, since one commodity 41 is prevented from being read a plurality of times, one commodity 41 is not registered as a plurality of commodities 41.

The barcode 33 is sometimes read from when the radio tag 32 is read until the reading stops in ST45. It is judged in ST46 whether or not the barcode 33 has been read. Moreover, if it is judged in ST46 that the barcode 33 has not been read, processing of ST55 is performed. Conversely, if it is judged in ST46 that the barcode 33 has been read, it is judged in ST52 whether or not the commodity information corresponding to the commodity identification information read from the radio tag 32 is the same as that corresponding to the commodity identification information read from the barcode 33.

If it is judged in ST52 that the commodity information from the radio tag 32 is different from that from the barcode 33, there is an error in the information of the barcode 33 or the radio tag 32 attached to the commodity 41, or two commodities 41 are read.

Therefore, in this case, an error sound is output from a loudspeaker 20 in ST53, and the operator is informed that there has been an error. Moreover, after ST53, the reading by the barcode reading section 19 is started in ST54, and the commodity detection of ST41 is performed again.

If it is judged in ST46 that the barcode 33 has not been read or if it is judged in ST52 that the commodity information from the radio tag 32 agrees with that from the barcode 33, the processing of ST55 is performed. Moreover, after the read commodity information is registered in ST55, a reading sound is output from the loudspeaker 20 in ST56 to inform the operator that the commodity registration has been performed. Thereafter, the reading by the barcode reading section 19 is started in ST57, and the commodity detection of ST41 is performed again. Consequently, it is possible to perform the commodity registration continuously.

If the radio tag 32 is not read in ST43 and if the barcode 33 is read in ST49, the reading by the barcode reading section 19 and that by the radio tag reading section 21 are stopped in ST50. Consequently, since one commodity 41 is prevented from being read a plurality of times, one commodity 41 is not registered as a plurality of commodities 41.

The radio tag 32 is sometimes read from when the barcode 33 is read until the reading stops in ST50. It is judged in ST51 whether or not the radio tag 32 has been read. Moreover, if it is judged in ST51 that the radio tag 32 has not been read, the processing of and after ST55 is performed. Conversely, if it is judged in ST51 that the radio tag 32 has been read, the processing of and after ST52 is performed. Moreover, if the reading by the barcode reading section 19 is started in ST57, the commodity registration can be performed again.

Consequently, in a case where the commodity identification information of the commodity 41 provided with the barcode 33 and the radio tag 32 is read, even when both of the barcode 33 and the radio tag 32 are read, one commodity 41 is correctly registered as one commodity. The operator is securely informed that the commodity can be registered.

Thereafter, the next commodity is also registered in accordance with the flowchart of FIG. 11. Accordingly, even in a case where the commodity 41 provided with the barcode 33 and the radio tag 32, the commodity 41 provided with the barcode 33 only, and the commodity 41 provided with the radio tag 32 only exist in a mixed manner, when the operator moves the commodity 41 from the basket 43 containing the commodity 41 before registered to the basket 42 for containing the registered commodity 41, the barcode 33 or the radio tag 32 is read to register the commodity information.

Moreover, it is sometimes difficult to read the barcode because of dirt on the barcode 33 portion or because a barcode 33 portion is not flat. Even in this case, when the barcode 33 and the radio tag 32 are attached to the commodity 41, the radio tag 32 is read by the radio tag reading section 21, and therefore an efficiency of the commodity registration is improved.

Moreover, in the present embodiment, since the reading field 44 of the radio tag 32 is disposed in the vicinity of the barcode reading section 19, the operator can visually recognize the reading field 44. As a result, an efficiency of a registering operation is improved.

Fourth Embodiment

Next, a fourth embodiment will be described with reference to FIG. 12. It is to be noted that in the following description, descriptions of a constitution and a function similar to those of the first to third embodiments are omitted.

The reading field 44 of the radio tag 32 in the third embodiment is disposed in such a manner as to include all of the reading field of the barcode 33. On the other hand, in the present embodiment, a reading field 44 of a radio tag 32 is disposed in a position closer to a basket 42 for containing a registered commodity 41 than a reading field of a barcode 33 is. That is, the reading field 44 is disposed in a position on a side opposite to a sensor section 22.

Figure 12:
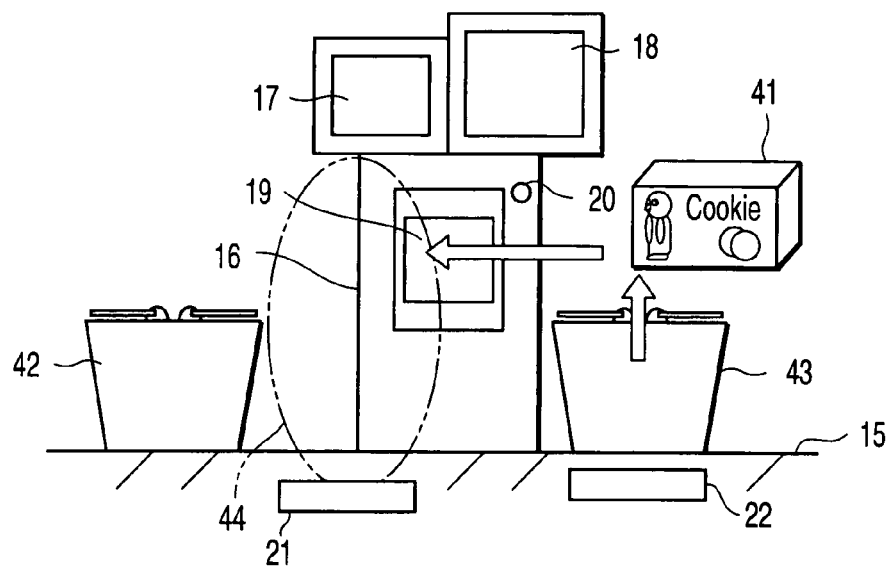
FIG. 12 is an explanatory view of the commodity-information reading according to a fourth embodiment of the present invention.

FIG. 12 is an explanatory view of commodity-information reading according to the fourth embodiment of the present invention. As shown in FIG. 12, in the same manner as in the third embodiment, a barcode reading section 19 can detect that the commodity 41 has entered the reading field, and a radio tag reading section 21 is started after the commodity detection.

First, an operator places the basket 42 for containing the registered commodity 41 on a commodity laying table 15. When a customer places a basket 43 containing the commodity 41 to purchase on the sensor section 22 of the commodity laying table 15, the sensor section 22 detects that the basket has been placed, and the barcode reading section 19 is started. At this time, the radio tag reading section 21 has not output any electromagnetic wave yet.

The operator takes the commodity 41 out of the basket 43, and moves the commodity 41 in an arrow direction. In a case where the barcode 33 is attached to the commodity 41, the operator moves the commodity 41 to the barcode reading section 19, while moving the commodity 41, and changing a direction of the commodity 41 in such a manner that the barcode 33 attached to the commodity 41 turns to the barcode reading section 19. Even when the barcode 33 is not attached to the commodity 41, the operator changes the direction of the commodity 41 appropriately, while moving the commodity 41 to the barcode reading section 19.

When it is detected that the commodity 41 has entered the reading field of the barcode reading section 19, the radio tag reading section 21 radiates an electromagnetic wave, and the reading field 44 of the radio tag 32 appears. Consequently, only when the commodity 41 comes close to the reading field 44 of the radio tag 32, the electromagnetic wave for reading the radio tag 32 is output. Therefore, unnecessary power consumption is suppressed, and interference with another apparatus is also suppressed.

When the barcode 33 is attached to the commodity 41, the barcode 33 of the commodity 41 is read by the barcode reading section 19. Even in a case where the barcode reading section 19 cannot read the barcode 33 of the commodity 41, when the radio tag 32 is attached to the commodity 41, and the radio tag 32 attached to the commodity 41 enters the radio tag reading field 44, the radio tag 32 of the commodity 41 is read by the radio tag reading section 21.

A procedure for reading commodity identification information and registering commodity information is the same as that of FIG. 11 described in the third embodiment, and a similar effect is obtained. Consequently, even in a case where the commodity 41 provided with the barcode 33 and the radio tag 32, the commodity 41 provided with the barcode 33 only, and the commodity 41 provided with the radio tag 32 only exist in a mixed manner, when the operator moves the commodity 41 from the basket 43 containing the commodity 41 before registered to the basket 42 for containing the registered commodity 41, the barcode 33 or the radio tag 32 is read to register the commodity information.

Moreover, it is sometimes difficult to read the barcode 33 because of dirt on the barcode 33 portion or because a barcode 33 portion is not flat. Even in this case, when the barcode 33 and the radio tag 32 are attached to the commodity 41, the radio tag 32 is read by the radio tag reading section 21, and therefore an efficiency of the commodity registration is improved.

Especially, in a store in which there are many commodities 41 provided with the barcodes 33, and there are less commodities 41 provided with the radio tags 32, the operator allows the barcodes 33 to be read in many cases. Therefore, by use of the present embodiment, a reading operation is rapidly enhanced.

Fifth Embodiment

Next, a fifth embodiment will be described with reference to FIG. 13. It is to be noted that in the following description, descriptions of the same constitution and function as those of the first to fourth embodiments are omitted.

In the first to fourth embodiments, the radio tag reading section 21 is fixed. On the other hand, in the present embodiment, a radio tag reading section 21 is movable with respect to a barcode reading section 19.

Figure 13:
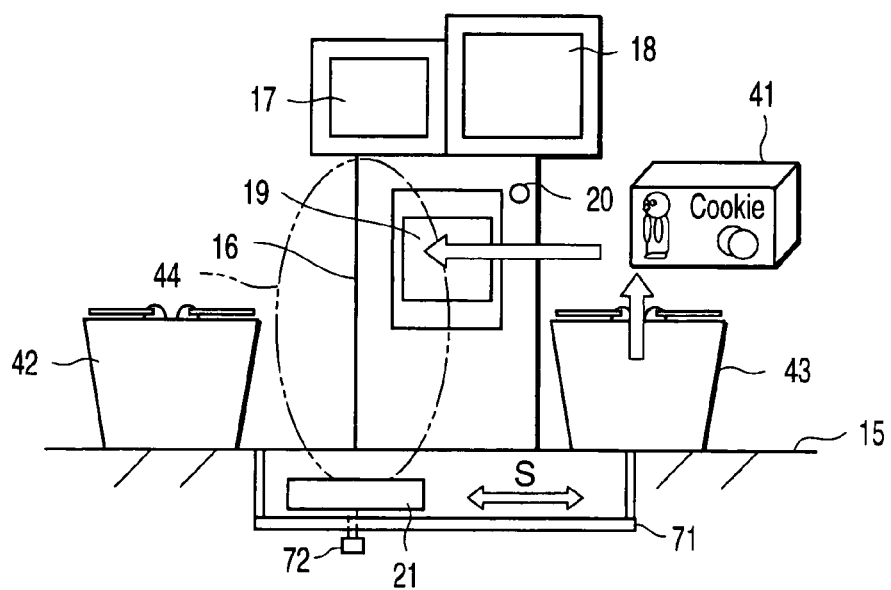
FIG. 13 is an explanatory view of the commodity-information reading according to a fifth embodiment of the present invention.

FIG. 13 is an explanatory view of commodity-information reading according to the fifth embodiment of the present invention. As shown in FIG. 13, in the present embodiment, the radio tag reading section 21 is movable with respect to the barcode reading section 19 as described above. Therefore, a reading field 44 of the radio tag reading section 21 and a reading field of the barcode reading section 19 are relatively movable disposed. That is, the radio tag reading section 21 is constituted to be movable in a direction approaching a basket 43 for containing a commodity 41 before registered or a basket 42 for containing the commodity 41 after registered.

Specifically, a screw 72 which fixes the radio tag reading section 21 is disposed under a commodity laying table 15. A fixed portion 71 is fixed to the commodity laying table 15. When the screw 72 is loosened, the screw 72 is movable together with the radio tag reading section 21 in a direction of an arrow S in the figure. When the radio tag reading section 21 is moved to an appropriate position, and the screw 72 is tightened there, the radio tag reading section 21 and the screw 72 is fixed to the fixed portion 71.

For example, in a store in which there are many commodities 41 provided with barcodes 33, and there are less commodities 41 provided with radio tags 32, the radio tag reading section 21 is fixed in such a manner as to be positioned in the same manner as in the fourth embodiment. In a store in which the commodities 41 provided with the radio tags 32 substantially occupy a half of all the commodities, the radio tag reading section 21 is fixed in such a manner as to be positioned in the same manner as in the third embodiment. In a store in which there are many commodities 41 provided with radio tags 32, the radio tag reading section 21 is fixed in such a manner as to be positioned in the same manner as in the first embodiment. In a store in which the number of the commodities provided with the radio tags 32 gradually increases, the radio tag reading section 21 is first positioned in the same manner as in the fourth embodiment. When the commodities 41 provided with the radio tags 32 increase, the radio tag reading section may be moved in the same manner as in the first embodiment.

Moreover, a procedure of commodity-information registration may be the same as that described in the first embodiment, but the procedure may be switched to that described in the third embodiment depending on a position where the radio tag reading section 21 is fixed. Consequently, since the position of the radio tag reading section 21 is optimized in accordance with a saturation ratio of the radio tags 32 in the store, an operation efficiency of commodity registration by an operator is improved.

The present invention is not limited to the above-described embodiments as such, and can be embodied by modification of constituting elements within a range that does not depart from the scope in an implementing stage. An appropriate combination of a plurality of constituting elements described in the above-described embodiments can form various inventions. For example, several constituting elements may be omitted from all the constituting elements described in the embodiments. Furthermore, the constituting elements of different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A commodity information registering apparatus for a point of sales system, the apparatus comprising:
    a radio tag reader which reads a radio tag within a first region to acquire commodity identification information stored in the radio tag;
    an optical reader which reads a code symbol within a second region at least partially overlapped with the first region to acquire commodity identification information described in the code symbol;
    a commodity laying table having an upper surface for placement of a commodity;
    a stationary scanner which is placed on a central part of the commodity laying table and incorporates the optical reader;
    a registration controller which registers one of the commodity information corresponding to the commodity identification information acquired from the radio tag; and
    a shielding plate which is placed on the commodity laying table and intercepts an electromagnetic wave generated from the radio tag reader on the commodity laying table,
    wherein the shielding plate is located between a upper surface of the commodity laying table for placement of a commodity and the radio tag reader.

2. The commodity information registering apparatus according to claim 1, further comprising:
    a sensor provided in the commodity laying table to detect that a basket is placed on the commodity laying table,
    wherein the shielding plate is located between the radio tag reader and the sensor.

3. The commodity information registering apparatus according to claim 2, further comprising: a controller which starts up the radio tag reader when detecting that the basket is placed above the sensor.

4. The commodity information registering apparatus according to claim 2, further comprising: a startup controller which starts up the optical reader when detecting the basket is placed above the sensor.

5. The commodity information registering apparatus according to claim 1, wherein the radio tag reader is located upstream in a moving direction of the commodity with respect to the optical reader.

6. The commodity information registering apparatus according to claim 1, further comprising: a speaker which outputs an error sound, when the radio tag reader acquires the commodity identification information stored in the radio tag, and the optical reader acquires the commodity identification information acquired by the radio tag reader is not coincident with that acquired by the optical reader.

7. The commodity information registering apparatus according to claim 1, further comprising: a speaker which makes, when a plurality of radio tags are read by the radio tag reader at the same time, a notification indicating that the radio tags are read.

8. The commodity information registering apparatus according to claim 1, further comprising a display which displays commodity information corresponding to the commodity identification information read by the radio tag reader, wherein the display is disposed above the stationary scanner.

9. The commodity information registering apparatus according to claim 8, wherein a major surface of the stationary scanner is substantially perpendicular to an upper surface of the commodity laying table.

10. The commodity information registering apparatus according to claim 9, further comprising:
    a keyboard for commodity registration disposed above the stationary scanner.

11. A commodity information registering apparatus for a point of sales system, the apparatus comprising:
    radio tag reading means for reading a radio tag within a first region to acquire commodity identification information stored in the radio tag; and
    optical reading means for reading a code symbol within a second region at least partially overlapped with the first region to acquire commodity identification information described in the code symbol;
    a commodity laying table having an upper surface for placement of a commodity;
    stationary scanning means incorporating the optical reading means and placed on the central part of the commodity laying table;
    registration controlling means for registering commodity information corresponding to commodity identification information acquired from the radio tag; and
    shielding means, placed on the commodity laying table, for intercepting an electromagnetic wave generated from the radio tag reading means on the commodity laying table,
    wherein the shielding means is located between a upper surface of the commodity laying table for placement of a commodity and the radio tag reading means.

12. The commodity information registering apparatus according to claim 11, further comprising:
    sensor means provided in the commodity laying table to detect that a basket is placed on the commodity laying table;
    wherein the shielding means is located between the radio tag reading means and the sensor means.

13. The commodity information registering apparatus according to claim 11, wherein the radio tag reading means is located upstream in a moving direction of the commodity with respect to the optical reading means.

14. The commodity information registering apparatus according to claim 11, which further comprises:
   determination means for determining, when the radio tag reading means acquires the commodity identification information stored in the radio tag, and the optical reading means acquires the commodity identification information described in the code symbol, whether or not the commodity identification information acquired by the radio tag reading means is coincident with that acquired by the optical reading means; and
   error means for outputting an error sound when the determination means determines that the commodity identification information acquired by the radio tag reading means is not coincident with that acquired by the optical reading means.

15. The commodity information registering apparatus according to claim 11, further comprising notifying means for making, when a plurality of radio tags are read by the radio tag reading means at the same time, a notification indicating that the radio rags are read.

16. The commodity information registering apparatus according to claim 11, further comprising:
   means for displaying commodity information corresponding to commodity identification information read by the radio tag reading means,
   wherein the means for displaying is disposed above the means for stationary scanning.

17. The commodity information registering apparatus according to claim 16, wherein a major surface of the means for stationary scanning is substantially perpendicular to an upper surface of the commodity laying table.

18. The commodity information registering apparatus according to claim 17, further comprising:
   a keyboard for commodity registration disposed above the means for stationary scanning.

\* \* \* \* \*